(12) United States Patent
Zhang (10) Patent No.: US 9,130,672 B2
(45) Date of Patent: Sep. 8, 2015

(54) SYSTEM AND METHOD FOR FAULT IDENTIFICATION IN OPTICAL COMMUNICATION SYSTEMS

(71) Applicant: Tyco Electronics Subsea Communications LLC, Morristown, NJ (US)

(72) Inventor: Hongbin Zhang, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 96 days.

(21) Appl. No.: 13/754,344

(22) Filed: Jan. 30, 2013

(65) Prior Publication Data

US 2014/0212131 A1    Jul. 31, 2014

(51) Int. Cl.
*H04B 10/00* (2013.01)
*H04B 10/071* (2013.01)
*H04B 10/077* (2013.01)
*H04B 10/291* (2013.01)

(52) U.S. Cl.
CPC .......... *H04B 10/071* (2013.01); *H04B 10/0771* (2013.01); *H04B 10/2918* (2013.01)

(58) Field of Classification Search
CPC ......... H04B 1/0777; H04B 1/035; H04B 1/07
USPC .......................................................... 398/11
See application file for complete search history.

(56) References Cited

U.S. PATENT DOCUMENTS

| | | | | |
|---|---|---|---|---|
| 5,926,263 | A * | 7/1999 | Lynch et al. | 356/73.1 |
| 8,009,983 | B2 * | 8/2011 | Zhang | 398/37 |
| 8,135,274 | B2 | 3/2012 | Zhang et al. | |
| 2009/0324249 | A1 * | 12/2009 | Zhang | 398/177 |

* cited by examiner

*Primary Examiner* — Danny Leung (57) ABSTRACT

A repeater that enables both bi-directional optical time domain reflectometry (OTDR) and loop gain monitoring techniques that may be employed, for example, in particularly long repeater spans. In one embodiment, the repeater includes high loss loopback (HLLB) paths configured to couple test signals between incoming and outgoing fiber paths. The HLLB paths are coupled from the outputs to the inputs of amplifiers within the repeater and couple both OTDR and loopback signals from an outgoing fiber path to an incoming fiber path so that may be returned to line monitoring equipment that transmitted the test signals.

19 Claims, 7 Drawing Sheets

SYSTEM AND METHOD FOR FAULT IDENTIFICATION IN OPTICAL COMMUNICATION SYSTEMS

TECHNICAL FIELD

The present application relates to communication systems and, more particularly, to fault identification in optical communication systems.

BACKGROUND

In long distance optical communication systems it may be important to monitor the health of the system. For example, monitoring can be used to detect faults or breaks in the optical transmission cable, faulty repeaters or amplifiers, and/or other problems with the system.

In general, known monitoring techniques include use of line monitoring equipment (LME) that generates one or more LME test signals, e.g. at different wavelengths. The LME may transmit the test signals with the information signals, e.g. in a wavelength division multiplexed (WDM) system. The test signals may be returned to the line monitoring equipment through a high-loss loop back (HLLB) path within an amplifier or repeater. The LME may then separate the returned test signals from the data signals, and process the returned test signals to obtain data representing a characteristic of the returned test signals as a metric for characterizing the optical path.

One such monitoring technique involves use of optical time domain reflectometry (OTDR) equipment and techniques. According to conventional OTDR techniques, the LME generates an OTDR test signal that may, for example, be an optical pulse or a specially modulated optical carrier, and launches the OTDR test signal into the outbound optical path of a path pair. Elements in the outbound path may reflect (e.g., backscatter) portions of the OTDR test signal. The backscattered signal portions may be returned (e.g., on the same outbound path or a different path such as the inbound path by coupling through an HLLB) and detected in the LME. The transmission characteristics of each element in the path may also affect the amount of signal reflected at points after that element, for example, by attenuating the test signal or the reflected signal. The magnitude of the backscattered or reflected signal from each element or point along the optical path may be used as a metric for characterizing the optical path.

OTDR techniques include coherent optical time domain reflectometry (COTDR). COTDR uses a special optical modulation scheme for its test signal and a coherent optical detection receiver to improve receiver sensitivity. The improved sensitivity enables measurement of very low levels of backscattered signal and thus the examination of very long optical fibers even if the fibers are in portions of the optical path far from the COTDR equipment (e.g., beyond an optical amplifier). Because Rayleigh backscatter from optical fiber in the transmission path can be detected by OTDR or COTDR, this approach to system monitoring provides a diagnostic tool that allows the user to examine the fiber between repeaters.

Another known line monitoring technique includes inspection of the loop gain of test signals through the HLLB paths within a system. In this approach, the LME may transmit one or more LME test signals representing, for example, a pseudo random bit sequence. The test signals may be returned to the line monitoring equipment through a high-loss loop back (HLLB) path within each amplifier or repeater. The LME may then process the returned test signals to obtain data representing the HLLB loop gain imparted to the test signals in their propagation from the LME, through the HLLB and any intervening optical paths and amplifiers, and back to the LME. Significant deviations in HLLB loop gain may indicate a fault in the system.

OTDR and loop gain monitoring techniques are challenged by the demands of modern long haul communication systems. For example, the cost of an undersea optical cable system and other such long haul communication systems is significantly influenced by the number of repeaters in the system. Thus, there is a continuing desire to expand the spacing between repeaters, so as to reduce the number of repeaters. Although the maximum possible repeater span has increased with improvements such as the introduction of advanced modulation formats, capability of OTDR equipment did not improve in step. In some systems, the reach of OTDR equipment may be limited to within 90 km, so that only about half of a repeater span may be measurable. Moreover, high loss loop back (HLLB) paths in some systems only allow measuring reflected Rayleigh signals from the outgoing direction, because they only have one path connecting from one amplifier output of a repeater to the other amplifier output of that repeater. As such, some conventional architectures may not be able to measure the Rayleigh signal from the incoming fiber path.

With regard to loop gain measurements, it is known that repeater pump power loss and increased fiber span loss may be primary failure mechanisms resulting in HLLB loop gain deviations from normal values. In a known system, significant variations in HLLB loop gain, e.g. above a predefined alarm threshold, may trigger a system alarm. Choice of the alarm threshold in such a system may require discrimination between normal system fluctuations and measurement errors and real transmission path faults. Unfortunately, this discrimination may be difficult since some HLLB loop gain measurements may be generally insensitive to physical changes in the transmission path due, in part, to the repeater loop back output-to-output architecture, as well as gain mechanisms in the repeater amplifier, e.g. self-gain regulation. Consequently, real path changes for non-devastating failures in such systems may result in HLLB loop gain changes in some systems that are only slightly detectable given typical measurement errors and system fluctuations.

One configuration for addressing the limited reach of OTDR is described in U.S. Pat. No. 8,009,983 entitled "High Loss Loop Back for Long Repeater Spans" (the '983 patent), the teachings of which are hereby incorporated herein by reference. The '983 patent describes HLLB configurations that allow bi-directional transmission of OTDR test signals to double the maximum measurable span length using OTDR. One configuration for addressing the sensitivity of loop gain monitoring techniques is described in U.S. Pat. No. 8,135,274 entitled "System and Method for Fault Identification in Optical Communication Systems" (the '274 patent), the teachings of which are hereby incorporated herein by reference. The '274 patent describes a HLLB configuration that increases the sensitivity of the loop gain measurements and compares loop gain measurements against a pre-determined gain signature to identify system faults. Unfortunately, however, the HLLB configuration described in the '983 patent for addressing the limited reach of OTDR does not provide the loop gain sensitivity improvements described in the '274 patent, and the HLLB configuration described in the '274 patent for achieving increased loop gain sensitivity does not support the OTDR reach improvements described in the '983 patent.

BRIEF DESCRIPTION OF THE DRAWINGS

FIG. 2d illustrates the path of a loopback test signal through the repeater of FIG. 2a.

DETAILED DESCRIPTION

Figure 1:
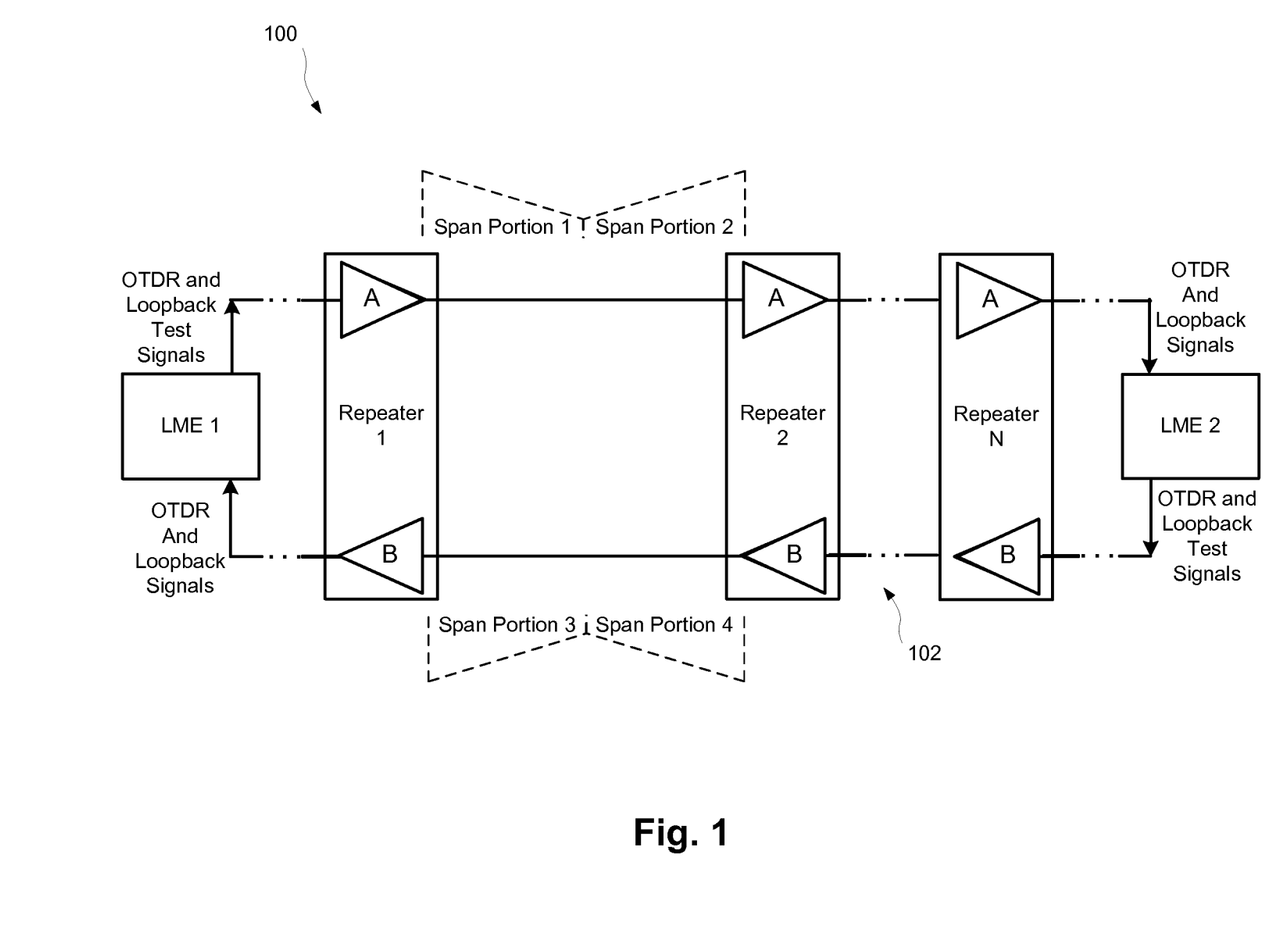
FIG. 1 is a block diagram of a system configured consistent with an embodiment of the present disclosure.

FIG. 1 is a block diagram of a system 100 configured consistent with an embodiment of the present disclosure. As can be seen, the system 100 includes a number N of repeaters (repeater 1, repeater 2 . . . repeater N) operatively coupled via optical fibers as typically done to form a transmission path 102. The term "coupled" or "operatively coupled" as used herein refers to any connection, coupling, link or the like by which signals carried by one system element are imparted to the "coupled" element or elements. Such "coupled" devices are not necessarily directly connected to one another and may be separated by intermediate components or devices that may manipulate or modify such signals.

The repeaters are separated by repeater spans. For example, the span between repeater 1 and repeater 2 includes span portions 1, 2, 3 and 4. Span portions 1, 2, 3, and 4 each represent a portion of the overall span length, and in one particular case, each span portion represents about one half of the distance between the repeaters.

One benefit of the architecture of repeaters 1 . . . N is that they can be used to facilitate OTDR monitoring of long repeater spans (in excess of 90 km, in their entirety) while also facilitating sensitive loop gain monitoring. As will be appreciated in light of this disclosure, the techniques and architectures described herein may be used with a wide variety of network components and configurations, and a given system may include multiple repeaters, spans of varying lengths, and/or other components such as transceivers at terminals of the system. Embodiments of the present disclosure are not intended to be limited to any particular components and/or configurations.

With further reference to the example system shown in FIG. 1, test signals can be provided to the transmission path 102 by line monitoring equipment (LME 1 and LME 2) deployed at each terminal of the system. The test signals may include OTDR test signals and loop gain test signals. The OTDR test signals are reflected by the transmission path and returned to the respective LME through a high loss loopback path (HLLB) in one or more repeaters. The loop gain test signals are returned to the respective LME through a HLLB in one or more repeaters as loopback signals.

Each of LME 1 and LME 2 can be implemented with conventional technology for analyzing the reflected signals and/or loop back signals, and in one particular embodiment, both are capable of providing test signals on wavelengths at the edges of the pass-band of the repeaters, so as to not interfere with actual data signals (e.g. of a wavelength division multiplexed signal), particularly if it is desired to carry-out testing during system use (so called "in-service mode"), as opposed to testing carried out when no actual data traffic is present (so called "out-service mode"). In general, and as previously explained, reflected signals (e.g., Rayleigh signals) and the loopback signals include information that allows the monitoring system to calculate parameters such as loop gain associated with the optical path, or otherwise evaluate the optical path traveled by the test signals. Variation in the loop gain or other relevant parameters may be used to generate an alarm indicating a fault in the system.

From the perspective of LME 1, the outgoing fiber path includes span portions 1 and 2, and the incoming fiber path includes span portions 4 and 3. From the perspective of LME 2, the outgoing fiber path includes span portions 4 and 3, and the incoming fiber path includes span portions 1 and 2. Consistent with an embodiment of the present disclosure, a HLLB architecture consistent with the present disclosure allows each LME to select a Rayleigh signal reflected from either the outgoing fiber path or the incoming fiber path by adjusting the optical frequency of the test signal. For instance, LME 1 is capable of measuring span portions 1 and 3, and LME 2 is capable of measuring span portions 2 and 4. Thus, the total measurement range of the monitoring system covers the whole repeater span in both communication directions. The incoming (or inbound) OTDR can be measured, for example, by in-service mode with very high spatial resolution (~100 m), and the outgoing (or outbound) OTDR can be measured by out-service mode. Multipath interference (MPI) and relative intensity noise (RIN) are comparable to conventional HLLB architectures.

In addition, the HLLB architecture allows loop gain test signals having a particular wavelength to be looped back to the LME that transmitted the test signals through each repeater. From the perspective of each LME, the HLLB couples the output of an amplifier on the outgoing fiber path to an input of an amplifier on an incoming fiber path. Fault analysis may be achieved by comparing loop gain data derived from the loopback signals to pre-determined fault signatures.

Figure 2A:
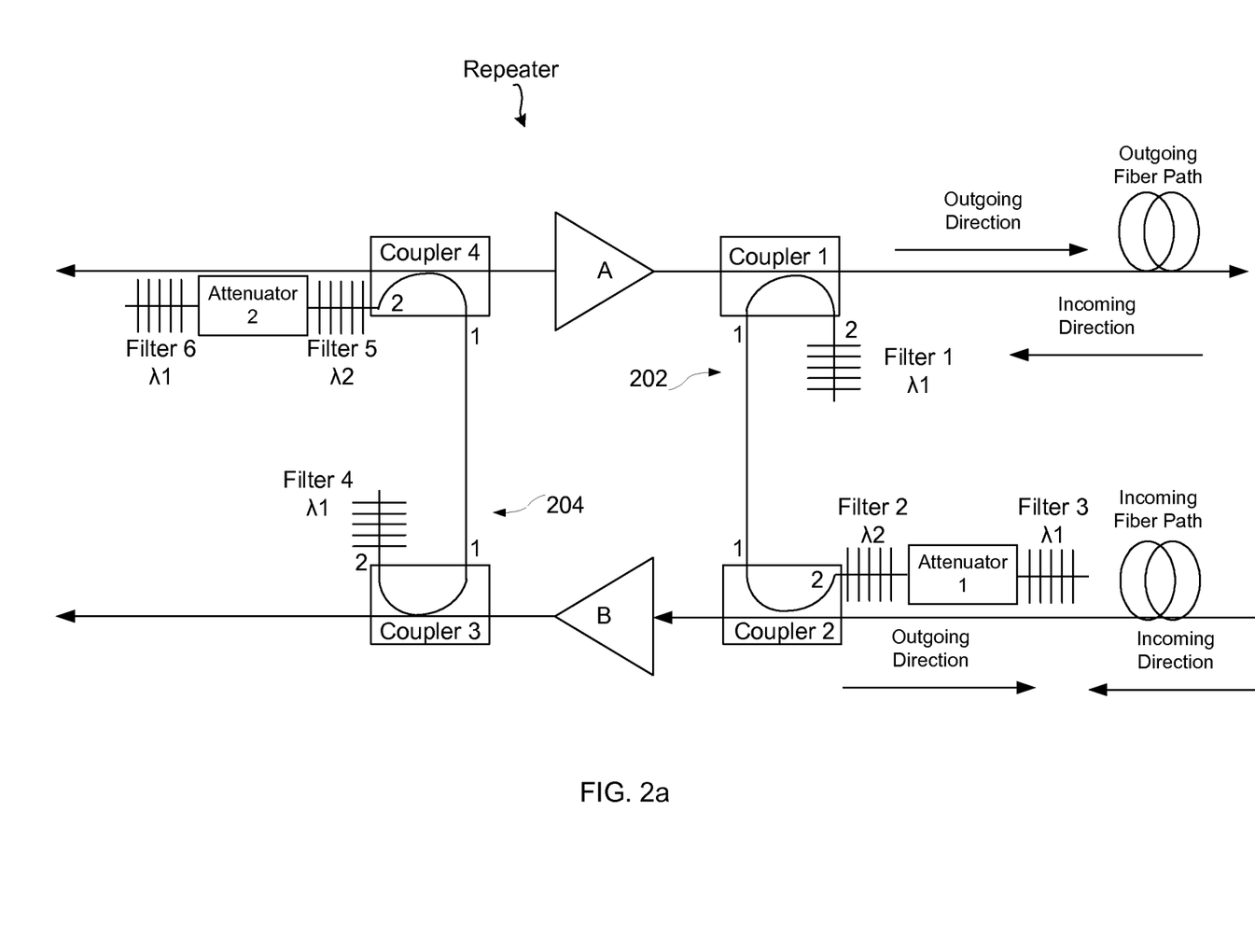
FIG. 2a is a block diagram of a repeater shown in the system of FIG. 1, configured consistent with an embodiment of the present disclosure.

FIG. 2a is a block diagram of a repeater shown in the system of FIG. 1 and configured consistent with an embodiment of the present disclosure. As shown, the repeater includes an amplifier pair (amplifiers A and B), four optical couplers (couplers 1, 2, 3, and 4), two optical attenuators (attenuator 1 and attenuator 2) and six wavelength selective filters (filters 1, 2, 3, 4, 5 and 6). The amplifiers A and B, optical couplers 1, 2, 3, and 4, attenuators 1 and 2, and filters 1, 2, 3, 4, 5 and 6 can be implemented with conventional technology, and operatively coupled using fiber and connection techniques suitable for the application at hand, given particulars such as operating wavelength range, power levels, length of span between repeaters, etc. The amplifiers A and B, for example, may be implemented with one or more erbium doped fiber amplifiers (EDFAs) or other rare earth doped fiber amplifiers, Raman amplifiers or semiconductor optical amplifiers, and may be provide in single stage or dual-stage configurations. Filters 1, 2, 3, 4, 5 and 6 may each take any of a variety of known filter configurations, and in one specific embodiment, are implemented as fiber Bragg grating filters.

The illustrated exemplary configuration includes a first HLLB path 202 and a second HLLB path 204. The first HLLB path 202 couples the output of amplifier A to the input of amplifier B. The second HLLB path 204 couples the output of amplifier B to the input of amplifier A.

The first HLLB path 202 includes couplers 1 and 2, filters 1, 2 and 3, and attenuator 1. Coupler 1 is coupled to the outgoing fiber path and coupler 2 is coupled to the incoming fiber path. Coupler 1 has first and second ports labeled 1 and 2, respectively, in FIG. 2a, and coupler 2 has first and second ports labeled 1 and 2, respectively in FIG. 2a. The first port of coupler 1 is coupled to the first port of coupler 2. Filter 1 is coupled to the second port of coupler 1. Filter 2 is coupled to the second port of coupler 2 and filter 3 is coupled to filter 2 through attenuator 1.

The first HLLB path 202 couples tests signals from LME 1 (FIG. 1) propagating on the outgoing fiber path at the output of amplifier A to the incoming fiber path at the input of amplifier B. The manner in which the first HLLB path couples test signals from the outgoing fiber path to the incoming fiber path depends on the direction of travel (i.e. outgoing or incoming) and the wavelength of the test signals.

For ease of explanation, arrows shown in FIGS. 2a-2d illustrate the direction of propagation of signals on the incoming and outgoing fiber paths with respect to LME 1 (FIG. 1). As shown, signals may propagate on the outgoing fiber path in an incoming direction toward the output of amplifier A or an outgoing direction away from the output of amplifier A. Likewise signals may propagate on the incoming fiber path in an incoming direction toward the input of amplifier B or an outgoing direction away from the input of amplifier B. Of course, with respect to LME 2 (FIG. 1) these directions would be reversed.

Signals propagating in an outgoing direction from the output of amplifier A toward the coupler are coupled onto the first HLLB path 202 by coupler 1 and are passed to filter 1. Filter 1 is configured to reflect only test signals of a desired wavelength and to terminate all other test signals. In this particular example, filter 1 reflects test signals having wavelength $\lambda 1$ and terminates all other test signals.

The test signal having wavelength $\lambda 1$ reflected by filter 1 is passed to coupler 2 at the input of amplifier B. Coupler 2 injects a portion (e.g., 2% of the total optical power) of the signal reflected by filter 1 into the incoming fiber path in an outgoing direction, i.e. in a direction away from amplifier B. Coupler 2 directs the remaining portion of the signal reflected by filter 1 to filter 2. The output of filter 2 is coupled to the input of attenuator 1, e.g. a 10 dB attenuator, and the output of attenuator 1 is coupled to filter 3. Filter 2 is configured to reflect test signals of a desired wavelength and to pass all other test signals. In this particular example, filter 2 reflects test signals having wavelength $\lambda 2$, which is a different wavelength than $\lambda 1$ (i.e., $\lambda 1 \neq \lambda 2$), and passes all other signals to attenuator 1. Attenuator 1 attenuates the signals passing through filter 2 and passes the attenuated signals to filter 3. Filter 3 is configured to reflect signals of a desired wavelength (or range of wavelengths) and to pass all other wavelengths. In this particular example, filter 3 reflects test signals having wavelength $\lambda 1$ and terminates all other signals. The signals having wavelength $\lambda 1$ reflected by filter 3 are passed through attenuator 1 again, through filter 2 and a portion thereof (e.g., 2% of the total optical power) is injected into the incoming fiber path in an incoming direction, i.e. in a direction toward the input of amplifier B.

Rayleigh reflected signals propagating in an incoming direction on the outgoing fiber path are coupled onto the first HLLB path 202 by coupler 1 and passed to coupler 2 without being imparted on filter 1. Coupler 2 injects a portion (e.g., 2% of the total optical power) of the signal into the incoming fiber path in an outgoing direction, i.e. in a direction away from amplifier B. Coupler 2 directs the remaining portion of the signal to filter 2. Filter 2 reflects test signals having wavelength $\lambda 2$ and passes all other signals to attenuator 1. Attenuator 1 attenuates the signals passing through filter 2 and passes the attenuated signals to filter 3. Filter 3 reflects test signals having wavelength $\lambda 1$ and terminates all other signals. Test signals having wavelength $\lambda 1$ are reflected by filter 3 is passed through attenuator 1 again, through filter 2 and a portion thereof (e.g., 2% of the total optical power) is injected into the incoming fiber path in an incoming direction.

When monitoring the outgoing fiber path (from perspective of LME 1) using OTDR, and as will be discussed with reference to FIG. 2b, a test signal having wavelength $\lambda 2$ transmitted from LME 1 propagates down the outgoing fiber path and is reflected by the outgoing fiber path. The reflected Rayleigh signal wavelengths having wavelength $\lambda 2$ are returned to coupler 1 in an incoming direction. Coupler 1 couples a portion of the reflected signal having wavelength $\lambda 2$ onto the first HLLB path 202 of the repeater (as just described). A portion of the reflected signal having wavelength $\lambda 2$ on the first HLLB path 202 is reflected by filter 2, coupled onto the incoming fiber path in an incoming direction by coupler 2 and returned to LME 1 for analysis so appropriate action (e.g., repair of fiber) can be taken if necessary.

When monitoring the incoming fiber path (from perspective of LME 1) using OTDR, and as will be discussed with reference to FIG. 2c, a test signal having wavelength $\lambda 1$ from LME 1 propagates down the outgoing fiber path in an outgoing direction and a portion thereof is coupled onto the first HLLB path 202 of the repeater by coupler 1 toward filter 1. The test signal having wavelength $\lambda 1$ is reflected by filter 1 to coupler 2, which injects a portion thereof onto the incoming fiber path in an outgoing direction. The test signal is reflected by the incoming fiber path. The reflected Rayleigh signal wavelengths having wavelength $\lambda 1$ propagate on the incoming fiber path in an incoming direction and are returned to LME 1 for analysis so appropriate action (e.g., repair of fiber) can be taken if necessary.

When performing loop gain analysis using LME 1, and as will be discussed with reference to FIG. 2d, a test signal having wavelength $\lambda 1$ from LME 1 propagates down the outgoing fiber path in an outgoing direction and a portion thereof is coupled onto the first HLLB path 202 of the repeater by coupler 1 toward filter 1. The test signal having wavelength $\lambda 1$ is reflected by filter 1 to coupler 2, which passes a portion thereof through filter 2 and attenuator 1. Filter 3 reflects the test signal having wavelength $\lambda 1$ back to through attenuator 1 and filter 2, and coupler 2 injects a portion thereof onto the incoming fiber path in an incoming direction. The test signal having wavelength $\lambda 1$ is returned to LME 1 as a loopback signal for analysis so appropriate action (e.g., repair of fiber) can be taken if necessary. Loopback signals are thus attenuated twice by attenuator 1.

The second HLLB path 204 includes couplers 3 and 4, filters 4, 5 and 6, and attenuator 2. Coupler 3 has first and second ports labeled 1 and 2, respectively, and coupler 4 has first and second ports labeled 1 and 2, respectively. The first port of coupler 3 is coupled to the first port of coupler 4. Filter 4 is coupled to the second port of coupler 3. Filter 5 is coupled to the second port of coupler 4 and filter 6 is coupled to filter 5 through attenuator 2. In general, the second HLLB path 204 operates in the same manner as described above with regard to the first HLLB path 202, except that the second HLLB path 204 couples test signals propagating from LME 2 (FIG. 1) at the output of the amplifier B to the input of amplifier A. Note that the incoming and outgoing fiber paths in FIGS. 2a-2c are labeled with respect to LME 1. These labels would be reversed with respect test signals propagating to and from LME 2.

For instance, and with the reversed labels in mind, when monitoring the outgoing fiber path (from perspective of LME 2) using OTDR a test signal having wavelength λ2 from LME 2 propagates through coupler 2, amplifier B and coupler 3. Reflected Rayleigh signal wavelengths having wavelength λ2 are returned to coupler 3. Coupler 3 couples a portion of the reflected signal having wavelength λ2 onto the second HLLB path 204. A portion of the reflected signal having wavelength λ2 on the HLLB path 204 is reflected by filter 5, coupled onto the incoming fiber path by coupler 4 and returned to LME 2 for analysis so appropriate action (e.g., repair of fiber) can be taken if necessary.

When monitoring the incoming fiber path (from perspective of LME 2) using OTDR, a portion of a test signal having wavelength λ1 from LME 2 is coupled onto the second HLLB path 204 by coupler 3 toward filter 4. The test signal having wavelength λ1 is reflected by filter 4 to coupler 4, which injects a portion thereof onto the incoming fiber path in an outgoing direction (from the perspective of LME 2). The reflected Rayleigh signal wavelengths having wavelength λ1 are returned to LME 2 for analysis so appropriate action (e.g., repair of fiber) can be taken if necessary.

When performing loop gain analysis using LME 2 a portion of a test signal having wavelength λ1 from LME 2 is coupled onto the second HLLB path 204 by coupler 3 toward filter 4. The test signal having wavelength λ1 is reflected by filter 4 to coupler 4, which passes a portion thereof through filter 5 and attenuator 2. Filter 6 reflects the test signal having wavelength λ1 back to through attenuator 2 and filter 5, and coupler 4 injects a portion thereof onto the incoming fiber path in an incoming direction (from the perspective of LME 2). The test signal having wavelength λ1 is returned to LME 2 for analysis so appropriate action (e.g., repair of fiber) can be taken if necessary. Loopback signals propagating from LME 2 are thus attenuated twice by attenuator 2.

Figure 2B:
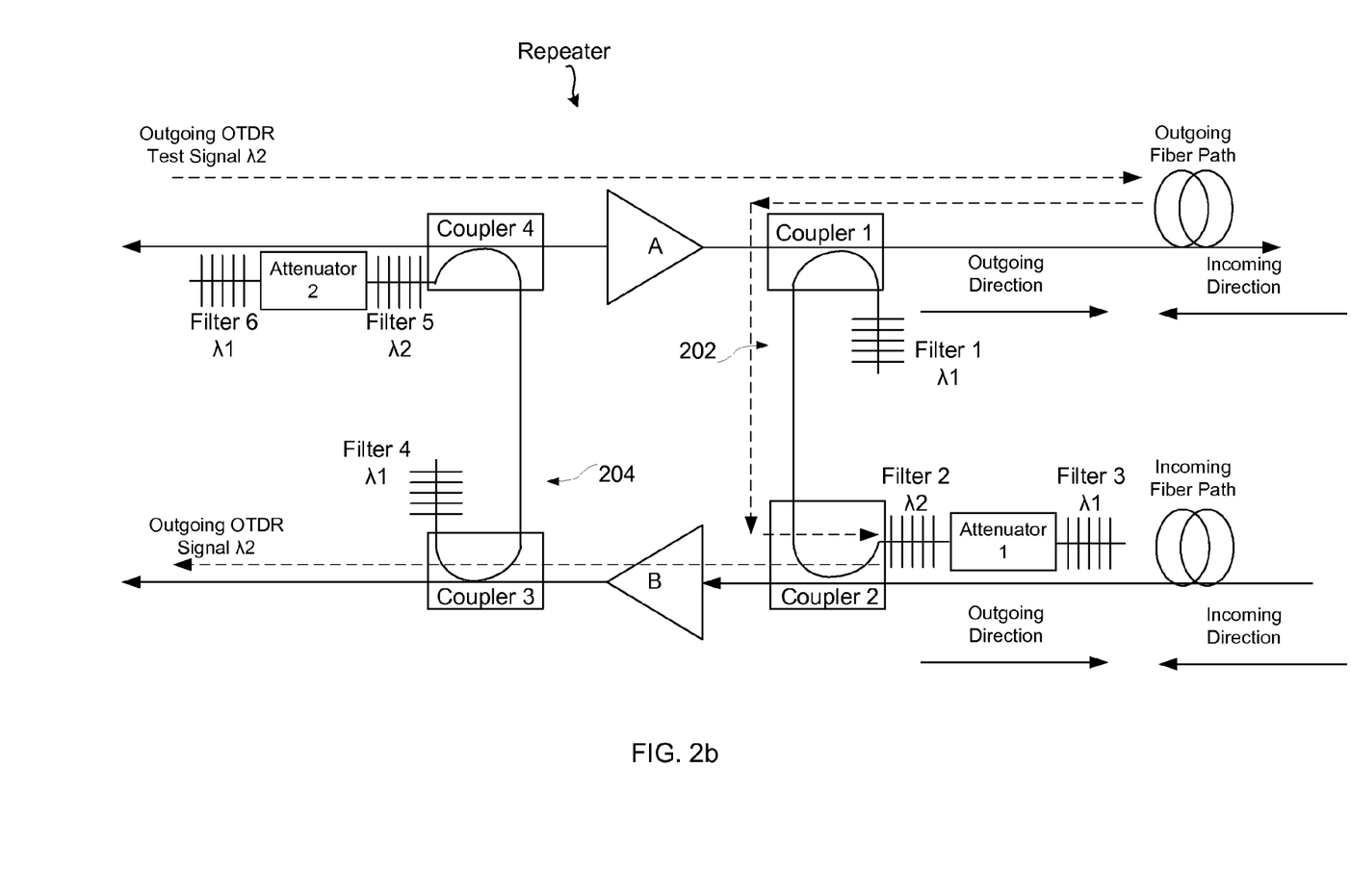
FIG. 2b illustrates the path of an outgoing OTDR test signal through the repeater of FIG. 2a and the reflected Rayleigh signal from the outgoing fiber path, consistent with an embodiment of the present disclosure.
Figure 2C:
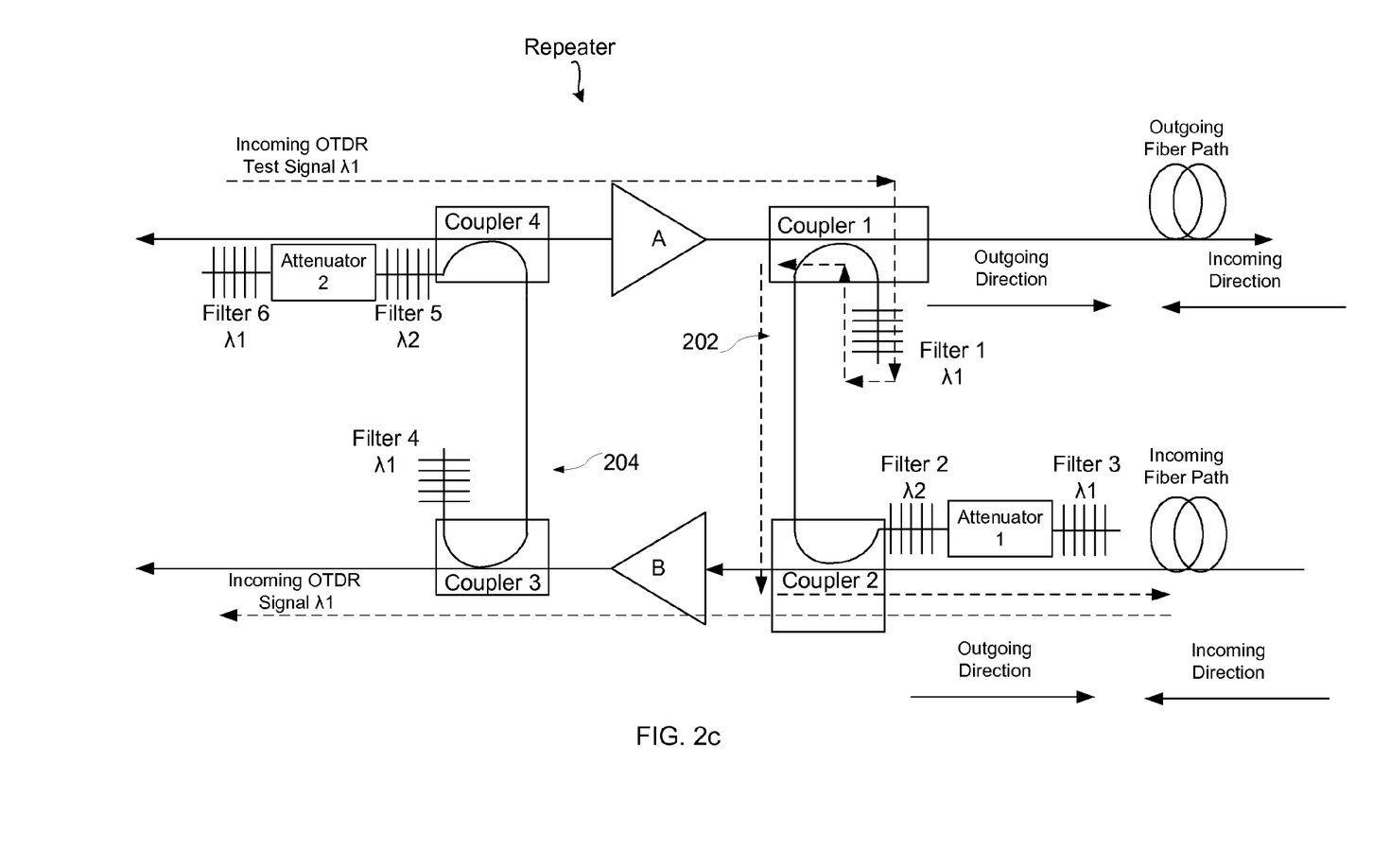
FIG. 2c illustrates the path of an incoming OTDR test signal through the repeater of FIG. 2a and the reflected Rayleigh signal from the incoming fiber path, consistent with an embodiment of the present disclosure.

FIGS. 2b and 2c illustrate operation of the repeater shown in FIG. 2a when performing outgoing and incoming OTDR measurements, respectively, from the perspective of LME 1 (FIG. 1). As shown in dashed lines in FIG. 2b, to perform an OTDR test of the outgoing fiber path an outgoing OTDR test signal having wavelength λ2 transmitted from LME 1 passes through coupler 4, amplifier A and coupler 1 in an outgoing direction. The outgoing OTDR test signal having wavelength λ2 is reflected by the outgoing fiber path and a portion of the reflected Rayleigh signal having wavelength λ2 propagating in an incoming direction on the outgoing fiber path passes through coupler 1, is reflected by filter 2, and a portion thereof is injected into the incoming fiber path in an incoming direction. The reflected Rayleigh signal is returned to LME 1 through amplifier B and coupler 3. The reflected Rayleigh signals are designated Outgoing OTDR signal in FIG. 2b. Advantageously, since the first HLLB path 202 couples the output of amplifier A to the input of amplifier B, attenuation of the outgoing OTDR test signal due to passing through couplers 2 and 4 is at least partially compensated by amplifier B.

To perform an OTDR test of the incoming fiber path, as shown in dashed lines in FIG. 2c, an incoming OTDR test signal having wavelength λ1 is transmitted from LME 1 in an outgoing direction and passes through coupler 4 and amplifier A. A portion thereof is coupled onto the first HLLB path 202 by coupler 1. The incoming OTDR test signal having wavelength λ1 is reflected by filter 1 and passed to coupler 2, which injects a portion thereof into the incoming fiber path in an outgoing direction. The incoming OTDR test signal having wavelength λ1 is reflected by the incoming fiber path and the reflected Rayleigh signal having wavelength λ1 is returned in an incoming direction to LME 1 through coupler 2, amplifier B and coupler 3. The reflected Rayleigh signals are designated incoming OTDR signal in FIG. 2c. Advantageously, since the first HLLB path 202 couples the output of amplifier A to the input of amplifier B, attenuation of the incoming OTDR test signal due to passing through couplers 2 and 4 is at least partially compensated by amplifier B.

Figure 2D:
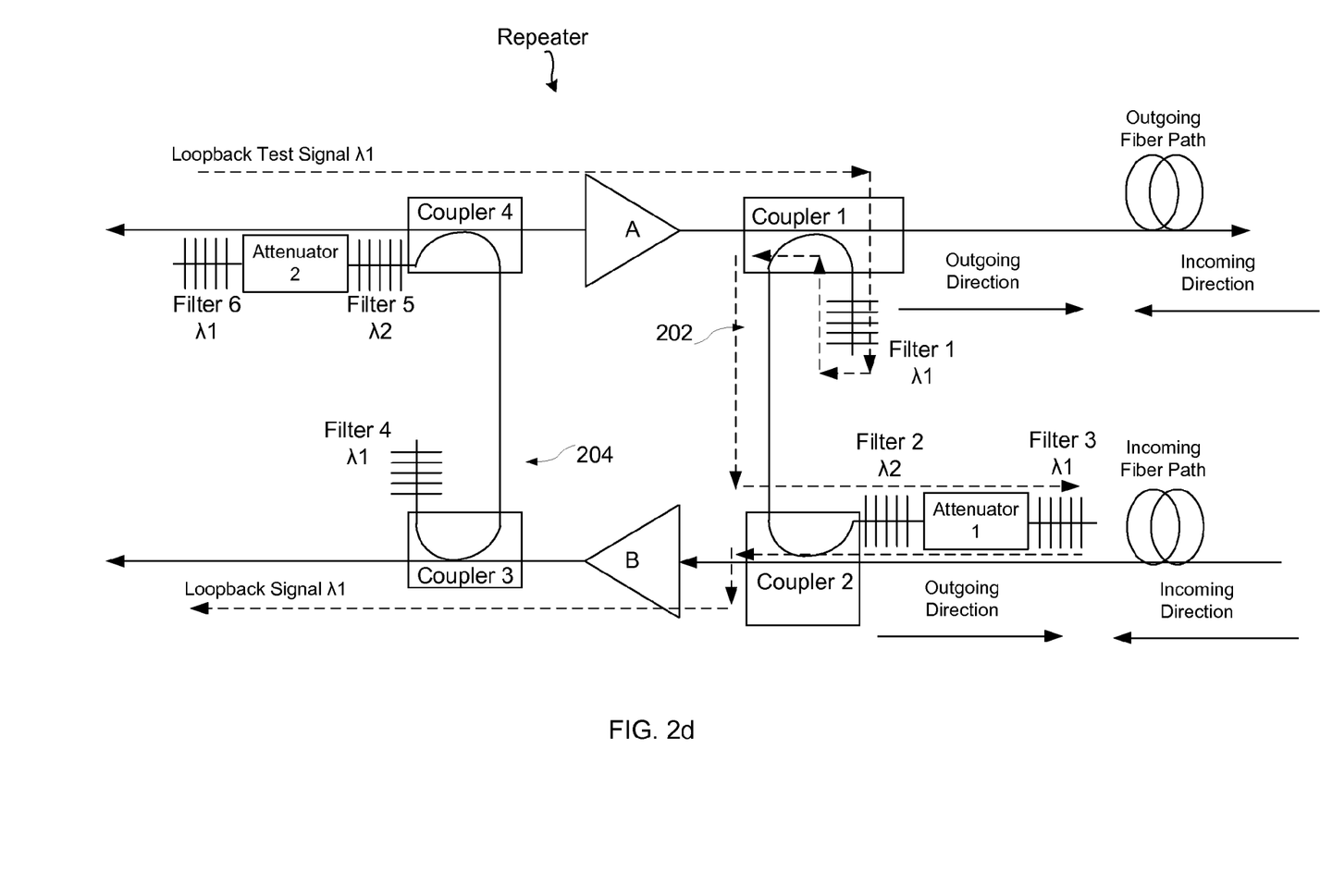

FIG. 2d illustrates operation of the repeater shown in FIG. 2a when performing a loopback measurement from the perspective of LME 1 (FIG. 1). As shown in dashed lines in FIG. 2d, to perform a loopback test a loopback test signal having wavelength λ1 is transmitted from LME 1 in an outgoing direction and passes through coupler 4 and amplifier A. A portion thereof is coupled onto the first HLLB path 202 by coupler 1. The loopback test signal having wavelength λ1 is reflected by filter 1 and passed to coupler 2. The loopback test signal passes through filter 2 and attenuator 1, and is reflected by filter 3 back through attenuator 1 and filter 2. Coupler 2 injects a portion of the loopback test signal that passes back through filter 2 into the incoming fiber path in an incoming direction. The loopback test signal having wavelength λ1 is returned to LME 1 through amplifier B and coupler 3 as a loopback signal. Advantageously, the loopback signal, as opposed to the OTDR test signals, is significantly attenuated by the first HLLB path 202 since it passes through the attenuator 1 twice. Attenuator 1 may be, for example, a 10 dB attenuator.

In the example embodiment shown in FIGS. 2a-2d, couplers 2 and 4 are each implemented with a 98%-to-2% coupler at the respective inputs of the amplifiers A and B, and couplers 1 and 3 are each implemented with a 90%-to-10% coupler at the respective outputs of the amplifiers A and B. The selection of 2% coupler at the inputs of the amplifiers A and B of the repeater is to allow for a low noise figure penalty due to added optical component. A 10% or higher coupler at the inputs may be used in a system consistent with the present disclosure, but may cause about 0.4 dB additional insertion loss. Thus, couplers 2 and 4 can be selected accordingly, depending on system demands.

A system consistent with the present disclosure thus facilitates OTDR testing of both incoming and outgoing fiber paths from either direction (i.e. from LME 1 or LME 2) as well as loop gain measurement from either direction. The loop gain data associated with each repeater may be calculated by comparing the loopback signal received through the repeater with a copy of the transmitted test signal associated with the loopback signal. The loop gain for any repeater may represent the gain and the loss imparted to the test signal from the LME to through the HLLB path associated with the repeater and back to the LME. A system consistent with the present disclosure may also or alternatively utilize differential loop gain data in analyzing system faults. The differential loop gain for each repeater may be calculated as the loop gain associated with repeater (e.g. repeater 2 in FIG. 1) minus the loop gain associated with previous repeater (e.g. repeater 1 in FIG. 1).

Providing a HLLB path consistent with the present disclosure that couples the output of an amplifier on one path to an input of the amplifier on the opposing path provides increased sensitivity to extra pump loss and extra fiber loss and higher resolvability to inbound and outbound fiber loss compared to an HLLB path that couples the output of an amplifier on one path to the output of an amplifier on the other path. Extra pump loss may be characterized by complete or partial failure of amplifier pump lasers within a repeater, resulting in a complete or partial reduction in the gain imparted by the associated amplifiers. Extra fiber loss may occur and may be characterized by additional or complete loss of transmission through the fiber path, e.g. in the spans between repeaters.

Figure 3:
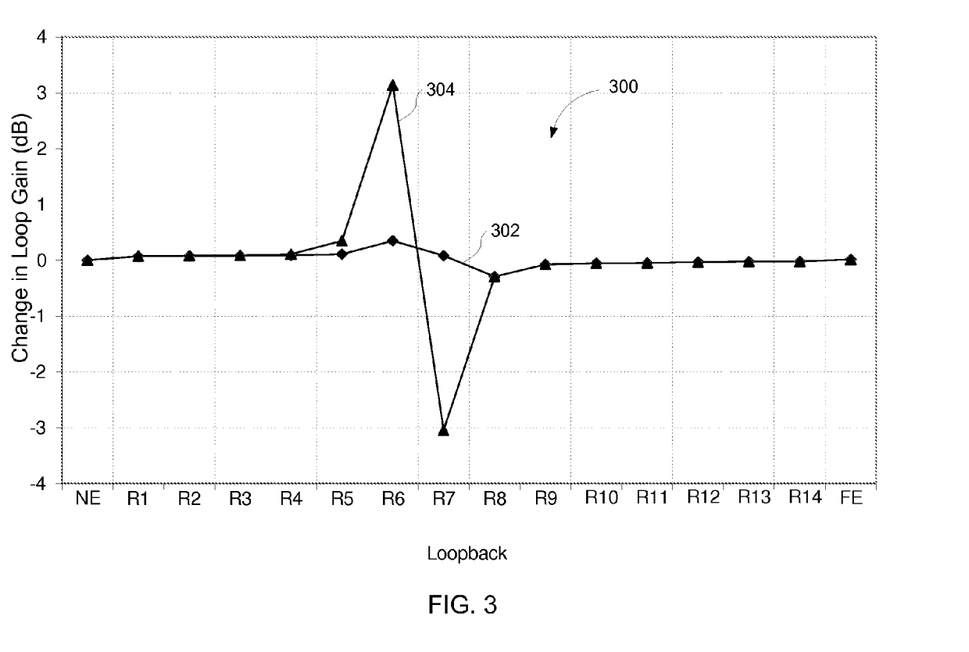
FIG. 3 includes exemplary simulated plots of change in loop gain vs. repeater loop back number associated with a 3 dB reduction in repeater pump power in an exemplary system consistent with the present disclosure.

FIG. 3, for example, includes exemplary simulated plots 300 of a change in loop gain vs. repeater loop back number associated with a system including fourteen repeaters with associated loop back paths R1 to R14 and including a 3 dB reduction in repeater pump power, i.e. extra pump loss, at the repeater associated with R7. Plot 302 illustrates the change in loop gain vs. loop back number when the system is configured with HLLB paths for coupling an output of a first amplifier amplifying signals in a first direction with an output of a second amplifier amplifying signals in a second direction opposite to the first direction. Plot 304 illustrates the change in loop gain vs. loop back number when the system is configured with HLLB paths consistent with the present disclosure, e.g. paths 202, 204, for coupling an output of a first amplifier (e.g. amplifier A) amplifying signals in a first direction with an input of a second amplifier (e.g. amplifier B) amplifying signals in a second direction opposite to the first direction. As shown, the 3 dB reduction in repeater pump power may result in a much larger change in loop gain when using a HLLB consistent with the present disclosure (i.e. the system has increased sensitivity).

Figure 4:
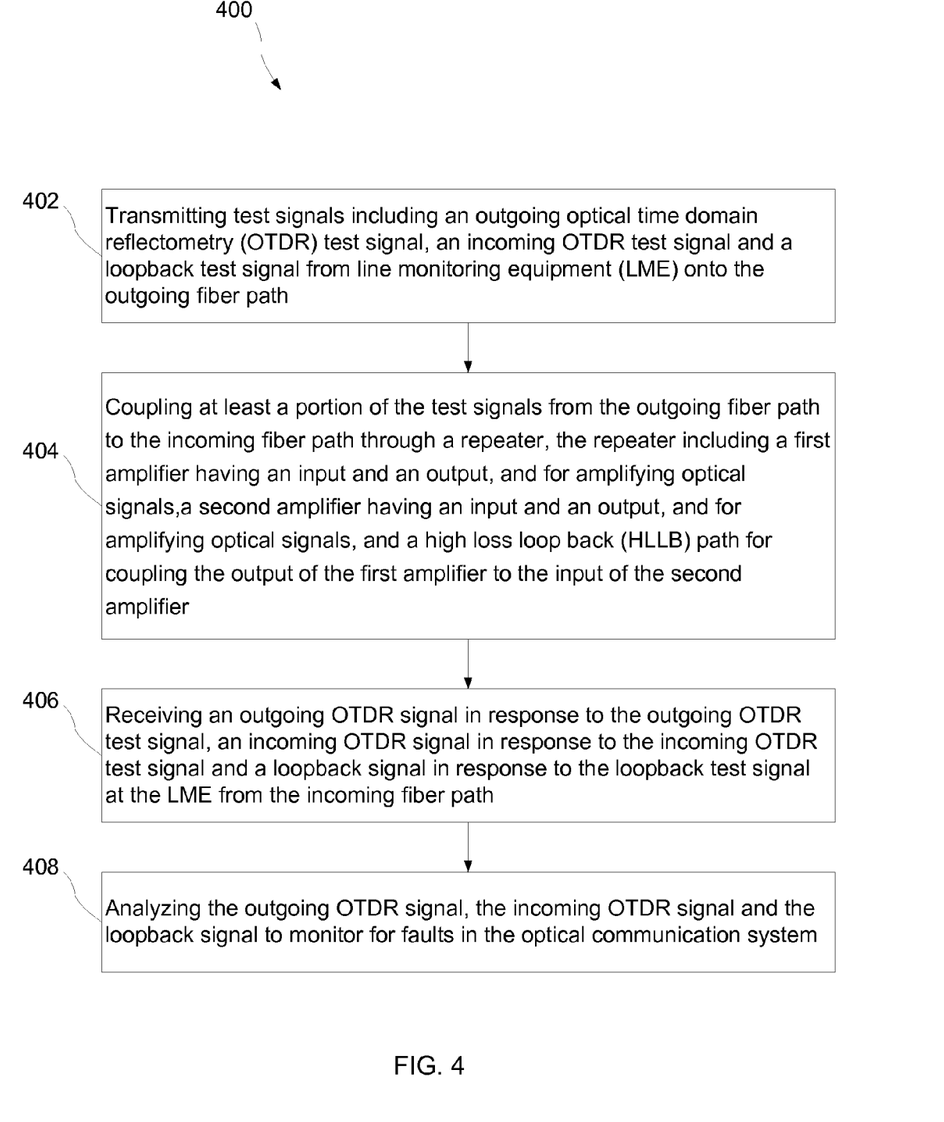
FIG. 4 is a flow chart illustrating one example of a method consistent with the present disclosure.

FIG. 4 is flow chart illustrating one example of a method 400 of monitoring an optical communication system comprising an outgoing fiber path and an incoming fiber path consistent with the present disclosure. The illustrated flow chart may be shown and described as including a particular sequence of steps. It is to be understood, however, that the sequence of steps merely provides an example of how the general functionality described herein can be implemented. The steps do not have to be executed in the order presented unless otherwise indicated.

In the illustrated method 400 test signals including an outgoing optical time domain reflectometry (OTDR) test signal, an incoming OTDR test signal and a loopback test signal are transmitted 402 from line monitoring equipment (LME) onto the outgoing fiber path. At least a portion of the test signals is coupled 404 from the outgoing fiber path to the incoming fiber path through a repeater. The repeater includes: a first amplifier having an input and an output, and for amplifying optical signals, a second amplifier having an input and an output, and for amplifying optical signals, and a high loss loop back (HLLB) path for coupling the output of the first amplifier to the input of the second amplifier. The method further includes receiving 406 an outgoing OTDR signal in response to the outgoing OTDR test signal, an incoming OTDR signal in response to the incoming OTDR test signal and a loopback signal in response to the loopback test signal at the LME from the incoming fiber path. The outgoing OTDR signal, the incoming OTDR signal and the loopback signal are then analyzed 408 to monitor for faults in the optical communication system.

According to one aspect of the disclosure there is thus provided a repeater for an optical communication system, the repeater being capable of operatively coupling to an incoming fiber path and an outgoing fiber path relative to a given direction of communication. The repeater includes a first amplifier having an input and an output, and for amplifying optical signals; a second amplifier having an input and an output, and for amplifying optical signals and a first high loss loop back (HLLB) path for coupling the output of the first amplifier to the input of the second amplifier. The first HLLB path is configured to: couple an outgoing optical time domain reflectometry (OTDR) test signal from a first line monitoring equipment (LME) and reflected from the outgoing fiber path to the incoming fiber path in an incoming direction, couple an incoming OTDR test signal from the first LME to the incoming fiber path in an outgoing direction, and couple a loopback test signal from the first LME to the incoming fiber path in an incoming direction.

According to another aspect of the disclosure there is provided an optical communication system, including: a plurality of repeaters operatively coupled to provide an optical transmission path. Each of the repeaters includes: a first amplifier having an input and an output, and for amplifying optical signals; a second amplifier having an input and an output, and for amplifying optical signals; a first high loss loop back (HLLB) path for coupling the output of the first amplifier to the input of the second amplifier; a second HLLB path for coupling the output of the second amplifier to the input of the first amplifier. Each of the first and second HLLB paths is configured to couple an associated outgoing optical time domain reflectometry (OTDR) test signal reflected from an associated outgoing fiber path to an associated incoming fiber path in an associated incoming direction, couple an associated incoming OTDR test signal to the associated incoming fiber path in an associated outgoing direction, and couple an associated loopback test signal to the associated incoming fiber path in the associated incoming direction. The system further includes: a first line monitoring equipment (LME) operatively coupled to a first end of the optical transmission path for analyzing signals returned to the first LME through the first HLLB path in response to the associated outgoing OTDR test signal, the associated incoming OTDR test signal and the associated loopback test signal; and a second line monitoring equipment (LME) operatively coupled to a second end of the optical transmission path for analyzing signals returned to the second LME through the second HLLB path in response to the associated outgoing OTDR test signal, the associated incoming OTDR test signal and the associated loopback test signal.

According to yet another aspect of the disclosure there is provided a method of monitoring an optical communication system including an outgoing fiber path and an incoming fiber path. The method includes: transmitting test signals including an outgoing optical time domain reflectometry (OTDR) test signal, an incoming OTDR test signal and a loopback test signal from line monitoring equipment (LME) onto the outgoing fiber path; coupling at least a portion of the test signals from the outgoing fiber path to the incoming fiber path through a repeater, the repeater including a first amplifier having an input and an output, and for amplifying optical signals, a second amplifier having an input and an output, and for amplifying optical signals, and a high loss loop back (HLLB) path for coupling the output of the first amplifier to the input of the second amplifier; receiving an outgoing OTDR signal in response to the outgoing OTDR test signal, an incoming OTDR signal in response to the incoming OTDR test signal and a loopback signal in response to the loopback test signal at the LME from the incoming fiber path; and analyzing the outgoing OTDR signal, the incoming OTDR signal and the loopback signal to monitor for faults in the optical communication system.

The embodiments that have been described herein but some of the several which utilize this disclosure and are set forth here by way of illustration but not of limitation. Many other embodiments, which will be readily apparent to those of ordinary skill in the art, may be made without departing materially from the spirit and scope of the disclosure.

What is claimed is:

1. A repeater for an optical communication system, the repeater being capable of operatively coupling to an incoming fiber path and an outgoing fiber path relative to a given direction of communication, the repeater comprising:
- a first amplifier having an input and an output, and for amplifying optical signals;
- a second amplifier having an input and an output, and for amplifying optical signals; and
- a first high loss loop back (HLLB) path for coupling the output of the first amplifier to the input of the second amplifier, the first HLLB path being configured to
- couple an outgoing optical time domain reflectometry (OTDR) test signal from a first line monitoring equipment (LME) and reflected from the outgoing fiber path from the output of the first amplifier to the input of the second amplifier and to the incoming fiber path in an incoming direction,
- couple an incoming OTDR test signal from the first LME from the output of the first amplifier to the input of the second amplifier and to the incoming fiber path in an outgoing direction, and
- couple a loopback test signal from the first LME from the output of the first amplifier to the input of the second amplifier and to the incoming fiber path in an incoming direction.

2. The repeater of claim 1, wherein the first HLLB path comprises:
- a first optical coupler coupled to the outgoing fiber path;
- a second optical coupler coupled to the incoming fiber path, the second optical coupler having a first port coupled to a first port of the first optical coupler;
- a first selective filter coupled to a second port of the first optical coupler;
- a second selective filter coupled to a second port of the second optical coupler; and
- a third selective filter coupled to the second selective filter.

3. The repeater of claim 2, the repeater further comprising an optical attenuator coupled between the second selective filter and the third selective filter.

4. The repeater of claim 2, wherein the first and third selective filters are configured to reflect test signals having a first wavelength, and wherein the second selective filter is configured to reflect test signals having a second wavelength.

5. The repeater of claim 4, wherein the loopback test signal and the incoming OTDR test signal are provided on the first wavelength, and wherein the outgoing OTDR test signal is provided on the second wavelength.

6. The repeater of claim 1, wherein the loopback test signal and the incoming OTDR test signal are provided on a first wavelength, and wherein the outgoing OTDR test signal is provided on a second wavelength different from the first wavelength.

7. The repeater of claim 1, the repeater further comprising a second HLLB path for coupling the output of the second amplifier to the input of the first amplifier, the second HLLB path being configured to:
- couple an outgoing OTDR test signal from a second LME and reflected from an outgoing fiber path with respect to the second LME to an incoming fiber path with respect to the second LME in an incoming direction with respect to the second LME;
- couple an incoming OTDR test signal from the second LME to the incoming fiber path with respect to the LME in an outgoing direction with respect to the second LME; and
- couple a loopback test signal from the second LME to the incoming fiber path with respect to the second LME in the incoming direction with respect to the second LME.

8. The repeater of claim 7, wherein the second HLLB path comprises:
- a third optical coupler coupled to the outgoing fiber path with respect to the second LME;
- a fourth optical coupler coupled to the incoming fiber path with respect to the second LME, the fourth optical coupler having a first port coupled to a first port of the third optical coupler;
- a fourth selective filter coupled to a second port of the third optical coupler;
- a fifth selective filter coupled to a second port of the fourth optical coupler; and
- a sixth selective filter coupled to the fifth selective filter.

9. An optical communication system, comprising:
- a plurality of repeaters operatively coupled to provide an optical transmission path, each repeater comprising:
  - a first amplifier having an input and an output, and for amplifying optical signals;
  - a second amplifier having an input and an output, and for amplifying optical signals;
  - a first high loss loop back (HLLB) path for coupling the output of the first amplifier to the input of the second amplifier;
  - a second HLLB path for coupling the output of the second amplifier to the input of the first amplifier,
  - each of the first and second HLLB paths being configured to
  - couple an associated outgoing optical time domain reflectometry (OTDR) test signal reflected from an associated outgoing fiber path to an associated incoming fiber path in an associated incoming direction,
  - couple an associated incoming OTDR test signal to the associated incoming fiber path in an associated outgoing direction, and
  - couple an associated loopback test signal to the associated incoming fiber path in the associated incoming direction;
- a first line monitoring equipment (LME) operatively coupled to a first end of the optical transmission path for analyzing signals returned to the first LME through the first HLLB path in response to the associated outgoing OTDR test signal, the associated incoming OTDR test signal and the associated loopback test signal; and
- a second line monitoring equipment (LME) operatively coupled to a second end of the optical transmission path for analyzing signals returned to the second LME through the second HLLB path in response to the associated outgoing OTDR test signal, the associated incoming OTDR test signal and the associated loopback test signal.

10. The system of claim 9, wherein each of the first and second HLLB paths comprises:
- a first optical coupler coupled to the associated outgoing fiber path;
- a second optical coupler coupled to the associated incoming fiber path, the second optical coupler having a first port coupled to a first port of the first optical coupler;
- a first selective filter coupled to a second port of the first optical coupler;
- a second selective filter coupled to a second port of the second optical coupler; and
- a third selective filter coupled to the second selective filter.

11. The system of claim 10, wherein each of the first and second HLLB paths comprises an optical attenuator coupled between the second selective filter and the third selective filter.

12. The system of claim 10, wherein the first and third selective filters are configured to reflect test signals having a first wavelength, and wherein the second selective filter is configured to reflect test signals having a second wavelength.

13. The system of claim 12, wherein the associated loopback test signal and the associated incoming OTDR test signal are provided on the first wavelength, and wherein the associated outgoing OTDR test signal is provided on the second wavelength.

14. The system of claim 9, wherein the associated loopback test signal and the associated incoming OTDR test signal are provided on a first wavelength, and wherein the associated outgoing OTDR test signal is provided on a second wavelength different from the first wavelength.

15. A method of monitoring an optical communication system comprising an outgoing fiber path and an incoming fiber path, the method comprising:
    transmitting test signals comprising an outgoing optical time domain reflectometry (OTDR) test signal, an incoming OTDR test signal and a loopback test signal from line monitoring equipment (LME) onto the outgoing fiber path;
    coupling at least a portion of the test signals from the outgoing fiber path to the incoming fiber path through a repeater, the repeater comprising
    a first amplifier having an input and an output, and for amplifying optical signals,
    a second amplifier having an input and an output, and for amplifying optical signals, and
    a high loss loop back (HLLB) path for coupling the output of the first amplifier to the input of the second amplifier;
    receiving an outgoing OTDR signal in response to the outgoing OTDR test signal, an incoming OTDR signal in response to the incoming OTDR test signal and a loopback signal in response to the loopback test signal at the LME from the incoming fiber path; and
    analyzing the outgoing OTDR signal, the incoming OTDR signal and the loopback signal to monitor for faults in the optical communication system, wherein the HLLB path is configured to couple the outgoing OTDR test signal, after reflection of the outgoing OTDR test signal from the outgoing fiber path, from the output of the first amplifier to the input of the second amplifier and to the incoming fiber path in an incoming direction, couple the incoming OTDR test signal from the output of the first amplifier to the input of the second amplifier and to the incoming fiber path in an outgoing direction, and couple the loopback test signal from the LME from the output of the first amplifier to the input of the second amplifier and to the incoming fiber path in an incoming direction.

16. The method of claim 15, wherein the HLLB path comprises:
    a first optical coupler coupled to the outgoing fiber path;
    a second optical coupler coupled to the incoming fiber path, the second optical coupler having a first port coupled to a first port of the first optical coupler;
    a first selective filter coupled to a second port of the first optical coupler;
    a second selective filter coupled to a second port of the second optical coupler; and
    a third selective filter coupled to the second selective filter.

17. The method of claim 16, wherein the HLLB path comprises an optical attenuator coupled between the second selective filter and the third selective filter.

18. The method of claim 16, wherein the first and third selective filters are configured to reflect test signals having a first wavelength, and wherein the second selective filter is configured to reflect test signals having a second wavelength.

19. The method of claim 15, wherein the loopback test signal and the incoming OTDR test signal are provided on a first wavelength, and wherein the outgoing OTDR test signal is provided on a second wavelength different from the first wavelength.

* * * * *